US008075783B2

(12) United States Patent
Jensen et al.

(10) Patent No.: US 8,075,783 B2
(45) Date of Patent: Dec. 13, 2011

(54) WATER REMEDIATION AND BIOSOLIDS COLLECTION SYSTEM AND ASSOCIATED METHODS

(75) Inventors: Kyle R. Jensen, Apopka, FL (US);
Ronald P. Allen, Sanford, FL (US);
Daniel Keys, Gastonia, NC (US)

(73) Assignee: AquaFiber Technologies Corp., Orlando, FL (US)

( * ) Notice: Subject to any disclaimer, the term of this patent is extended or adjusted under 35 U.S.C. 154(b) by 440 days.

(21) Appl. No.: 12/183,771

(22) Filed: Jul. 31, 2008

(65) Prior Publication Data
US 2009/0090673 A1 Apr. 9, 2009

Related U.S. Application Data

(60) Provisional application No. 60/952,965, filed on Jul. 31, 2007.

(51) Int. Cl.
*C02F 1/24* (2006.01)
*C02F 1/52* (2006.01)
*C02F 9/02* (2006.01)

(52) U.S. Cl. ............. 210/703; 210/704; 210/221.2; 210/205; 210/206; 210/170.01; 210/747.1; 210/170.09; 210/170.1; 210/170.05; 210/738; 210/744; 210/114; 210/121; 210/242.2; 210/747.5; 210/747.6; 210/747.8; 210/747.9

(58) Field of Classification Search .......... 210/703, 210/704, 747, 738, 744, 205, 206, 170.05, 210/170.09, 170.1, 114, 121, 221.2, 242.2, 210/170.01, 747.1, 747.5, 747.6, 747.8, 747.9
See application file for complete search history.

(56) References Cited

U.S. PATENT DOCUMENTS

| 2,793,185 | A | * | 5/1957 | Albrektsson et al. | ......... 210/703 |
| 2,874,842 | A |   | 2/1959 | Krofta |   |
| 3,015,621 | A | * | 1/1962 | Quast | ............ 210/205 |
| 3,063,939 | A | * | 11/1962 | Katz | ............ 210/703 |

(Continued)

FOREIGN PATENT DOCUMENTS
DE 4216096 A1 * 11/1993
(Continued)

OTHER PUBLICATIONS

Kram, Jerry W., Origin Oil Presents at Algae Conference, Biodiesel Magazine, Aug. 2008.

(Continued)

*Primary Examiner* — Thomas M Lithgow
(74) *Attorney, Agent, or Firm* — Jacqueline E. Hartt; GrayRobinson, P.A.

(57) ABSTRACT

A system and method for remediating a body of water and collecting suspended and dissolved solids therefrom are provided. The system includes a water-impervious lining positionable in a depression in or adjacent a body of water. The lining and depression define a treatment vessel, which includes a treatment portion, an outlet portion for containing treated water, and an outflow weir between the treatment portion and the outlet portion. Water to be treated is transported from the water body to the treatment portion. An entrapment element is delivered and mixed into the transported water, the entrapment element for capturing suspended and dissolved solids in the transported water and effecting a separation between the captured solids and water cleansed therefrom. The captured solids can be removed from the treatment basin, and the cleansed water can move through a channel in the outflow weir into the outlet portion.

14 Claims, 6 Drawing Sheets

U.S. PATENT DOCUMENTS

| | | | |
|---|---|---|---|
| 3,175,687 A * | 3/1965 | Jones | 210/120 |
| 3,182,799 A | 5/1965 | Krofta | |
| 3,313,795 A * | 4/1967 | Rubin | 210/705 |
| 3,671,022 A * | 6/1972 | Laird et al. | 261/29 |
| 3,755,142 A * | 8/1973 | Whipple, Jr. | 210/758 |
| 3,779,385 A * | 12/1973 | Strohecker | 210/154 |
| 3,784,010 A * | 1/1974 | Barra et al. | 210/114 |
| 3,971,719 A * | 7/1976 | Peters | 210/104 |
| 3,996,136 A * | 12/1976 | Jakubek et al. | 210/86 |
| 4,022,696 A | 5/1977 | Krofta | |
| 4,108,768 A * | 8/1978 | Sebelik et al. | 210/705 |
| 4,184,967 A | 1/1980 | Krofta | |
| 5,188,729 A | 2/1993 | Krofta | |
| 5,240,600 A | 8/1993 | Wang et al. | |
| 5,256,281 A * | 10/1993 | Ngo et al. | 210/151 |
| 5,935,447 A * | 8/1999 | Febres et al. | 210/703 |
| 6,279,611 B2 | 8/2001 | Uematsu et al. | |
| 6,613,232 B2 | 9/2003 | Chesner et al. | |
| 6,802,978 B2 * | 10/2004 | Gomes de Oliveira et al. | 210/703 |
| 2004/0245180 A1 * | 12/2004 | Gomes De Oliveira | 210/705 |
| 2006/0076290 A1 * | 4/2006 | Shockley et al. | 210/602 |
| 2009/0029445 A1 | 1/2009 | Eckelberry et al. | |

FOREIGN PATENT DOCUMENTS

| | | |
|---|---|---|
| DE | 4433634 A1 * | 3/1996 |
| GB | 2263694 A * | 8/1993 |
| GB | 2316336 A * | 2/1998 |
| JP | 09118291 A * | 5/1997 |
| WO | WO 92/11206 A1 * | 7/1992 |

OTHER PUBLICATIONS

Krofta, M. and Wang, L.K., Dissolved Air-Flotation Processes, Lenox Inst. for Research, Inc., Abstract of Technical Report, Nov. 5, 1986.

* cited by examiner

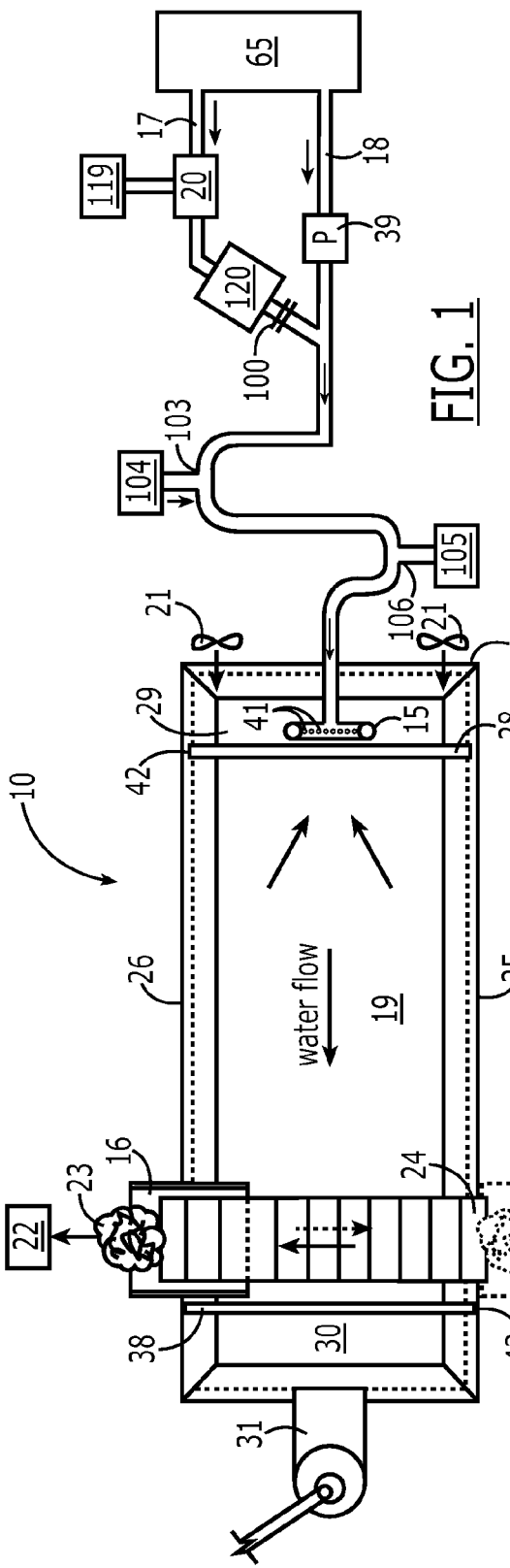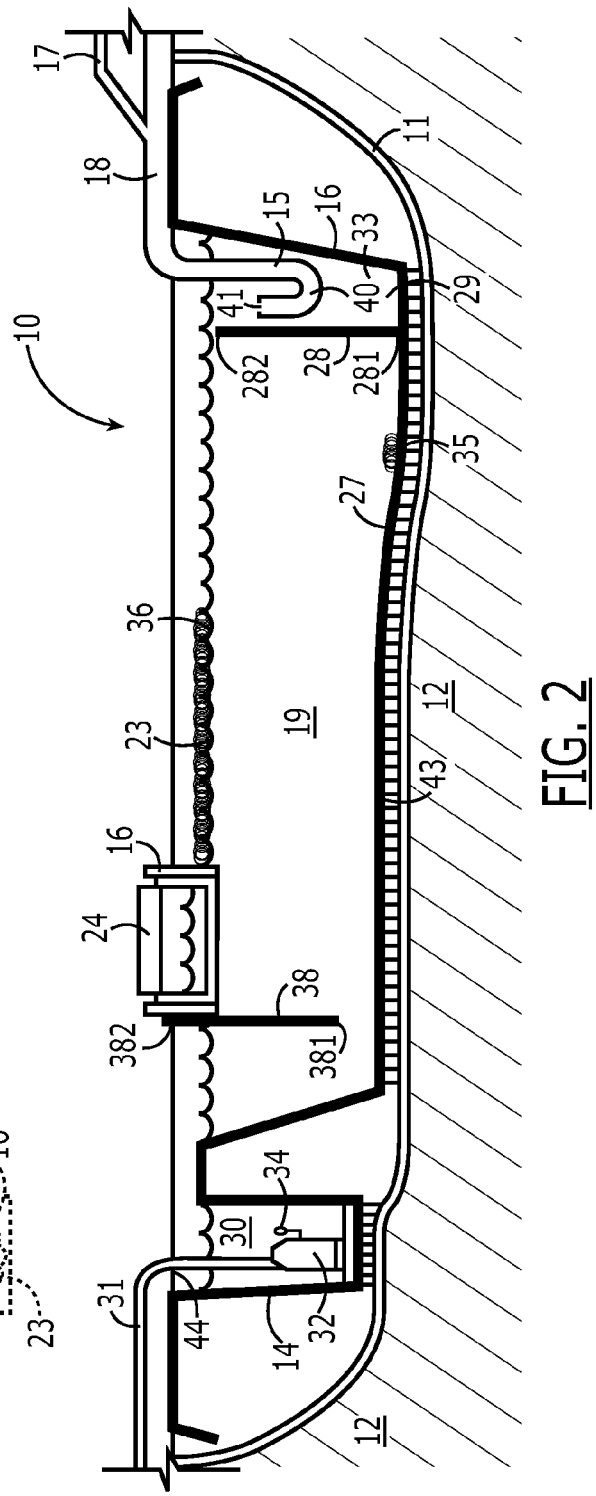

WATER REMEDIATION AND BIOSOLIDS COLLECTION SYSTEM AND ASSOCIATED METHODS

CROSS-REFERENCE TO RELATED APPLICATION

This application claims priority to provisional application Ser. No. 60/952,965, filed Jul. 31, 2007.

BACKGROUND OF THE INVENTION

1. Field of the Invention

The present invention relates to systems and methods for water remediation and biosolids collection, and, more particularly, to such systems and methods for remediating water and collecting water-borne solids using solids entrapment.

2. Description of Related Art

Dissolved air flotation (DAF) is a liquid process technology that uses micro-bubble airflotation to raise and remove suspended solids in an aqueous solution such as industrial process water, municipal waste water, and/or lake water.

DAF systems known in the art are constructed from steel or concrete tanks. Large liquid above-ground vessels require structural steel plate and backing stiffeners to preclude deformation of the tank walls during hydrostatic loading when full to operating levels. The steel vessels also require footings to transfer loads to soil with appropriate bearing capacities. Inert materials like 314 and 316 Stainless Steel or exotic epoxy coating systems are typically used to retard corrosion.

Wind mixing of shallow lakes causes loose non-photosynthetic sediment material to rise into the photic zone temporarily. This reactive nutrient-laden sediment often feeds the algae in the photic zone of an impaired (hypereutrophic) lake and causes a perpetual algal bloom, which can in some cases even be seen from space (the orbiting Space Shuttle can differentiate hypertrophic Lake Apopka in Florida from other lakes, for example). One means of water remediation is to remove, or harvest, suspended solids (SS) and the nutrients incorporated thereinto.

Traditional approaches for SS removal use large expanses (5,000-45,000 acres) of flooded wetland filters where quiescent conditions cause the SS to sink out and form soil. As soil decays, much of the settled-out nutrients go back into solution, causing inefficiency. If toxic cyanobacteria algae settle out in the wetland, toxins can become available to wildlife for years, both in soil and water. Still, this has been a preferred method for remediation where a great expanse of land is available.

A known difficulty in remediating water bodies is that systems must often operate where the soil is soft and wet, for example, adjacent or on lake shores. The expense associated with providing excavation, fill, and soil stabilization can be prohibitive, and the result unsightly in an area that is supposed to be being improved. Therefore, DAF systems have been considered unsuitable for on-site water body remediation. In addition, for at least some of the same reasons, using DAF technology in a water body has not been considered to be practicable.

Prior known DAF systems require a precise balancing of criteria such as inflow rate, coagulant delivery parameters, and sludge and flotation removal in order to function effectively. As larger DAF systems are known to be prohibitively expensive, the trend has been towards smaller vessels having specific geometries for optimizing filtration.

Other problems faced at the present time are the growing expense and decreasing supplies of fuel, and the disposal of biomass generated by bioremediation systems such as algal floways and other aquatic plant systems.

Therefore, it would be desirable to provide a system and method for remediating a body of water that is economical and effective, and that does not disturb an aesthetic appeal of the water body and the surrounding area. It would also be desirable to provide a system and method for disposing of collected biosolids and for generating fuel therefrom.

SUMMARY OF THE INVENTION

The present invention is directed in one aspect to a vessel construction that is innovative over and is significantly less costly than known water remediation and biosolids collection constructions. The present system includes structural differences from previously known systems, wherein flexural tension and compression capacity are provided by an extant support structure, such as soil or a body of water or a combination thereof.

The present invention achieves SS and dissolved solids removal by an innovative scale up of a solids entrapment process, such as, but not intended to be limited to, DAF. While DAF systems do not settle out 100% of the SS, they sequester and process all that they do remove, precluding release back into the surface water. This results in a huge increase in the nutrient removal per unit area when compared to known wetland techniques. Further, elements such as toxic algae are safely removed from the ecosystem, avoiding wildlife exposure.

Many scientists, such as the team at the St. Johns River Water Management District (SJRWMD), have studied solid removal systems such as DAF for application in polluted lakes such as Lake Apopka, Fla., as well as other surface waters, but found the scale of traditionally manufactured process components to be far too small and not economically feasible for the mammoth flow required for lake-scale applications. The present invention teaches a vessel construction and use that includes finely contoured excavations, geo-membrane technologies for soil, and inexpensive liner membranes to build a basin that does not require foundations or expensive steel or concrete vessels. Wind, gravity, tensile, flexural, and compressive loads from liquid pressure do not need to be resisted by the moisture barrier component of the vessel, thus greatly reducing the cost to construct a very large vessel.

A system for remediating a body of water and collecting suspended and dissolved solids therefrom is provided. The system comprises a water-impervious lining that is positionable in a depression in or adjacent a body of water desired to be treated. The lining and depression define outer boundaries of a treatment vessel, which comprises a treatment portion having an inlet for receiving water to be treated, an outlet portion for containing treated water, and an outflow weir between the treatment portion and the outlet portion. The outflow weir extends to a top end higher than a water surface, and across the vessel to side edges sealed against the opposed sides of the vessel.

Means are provided for transporting water to be treated from the water body to the treatment portion, for delivering an entrapment element to the transported water, and for mixing the entrapment element with the transported water. The entrapment element is for capturing suspended and dissolved solids in the transported water and effecting a separation between the captured solids and water cleansed therefrom. Means are also provided for removing the captured solids from the treatment basin, The cleansed water is movable through a channel in the outflow weir into the outlet portion.

The entrapment element can comprise one or more of a number of elements, such as, but not intended to be limited to, dissolved gas bubbles, a coagulant, and a flocculant.

In an embodiment, the vessel comprises an inflow baffle positioned adjacent an inlet end of the vessel. The inflow baffle extends from a bottom of the vessel at a bottom end to a top end beneath a water line in spaced relation from a top edge of the vessel, and extends across the vessel to side edges sealed against opposed sides of the vessel. The inflow baffle and an inlet portion of the vessel sides containing the inlet end thereby define an inflow basin. In some embodiments, the inflow baffle is not employed.

The vessel further comprises an outflow channel adjacent an outlet end of the vessel, adjacent the vessel bottom, and in spaced relation from the vessel top edge. The channel provides a pathway for cleansed water, which typically will reside at and adjacent the vessel bottom, to exit the vessel, while retaining floating material in the vessel for removal therefrom.

In a particular embodiment, the channel can be formed by an outflow weir that extends from a bottom end in spaced relation from the vessel bottom to a top end at least as high as the vessel top edge, and extends across the vessel to side edges sealed against the opposed sides of the vessel. The outflow weir and an outlet portion of the vessel sides containing the outlet end thereby define an outflow basin. The inflow baffle, if present, and the outflow weir define a treatment basin therebetween; if there is no inflow baffle, the inlet end and the outflow weir define the treatment basin.

In another embodiment, the channel can be formed by an aperture through the vessel outlet end, the aperture positioned adjacent the vessel bottom and in spaced relation from the water surface.

In a further embodiment, the channel can comprise piping having an inlet adjacent the outlet end, adjacent the vessel bottom and in spaced relation from the water surface. Pumping can then remove cleansed water through the piping.

Means are further provided for removing the bubbles and captured suspended solids from the water surface in the treatment basin. Water cleansed of the suspended solids can move through the outflow channel to a desired destination, for example, back into the water body.

In another embodiment for use with floating vessels, a DAF system may not be included, and solids entrapment means can be employed such as coagulants and/or flocculants, alone or in combination. An inlet of the floating vessel channels water to be treated to a treatment zone, wherein the solids entrapment means is added to the water and mixed. The entrapped solids will either float or sink, depending upon the type of entrapments means used. Water from which the solids has been removed is channeled out from the vessel, and the entrapped solids are collected and ultimately removed from the vessel.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 1 is a top plan view of an exemplary dissolved-air-flotation device for the removal of suspended solids in wastewater.

FIG. 2 is a side cross-sectional view of the embodiment of FIG. 1.

DETAILED DESCRIPTION OF THE PREFERRED EMBODIMENTS

Figure 3:
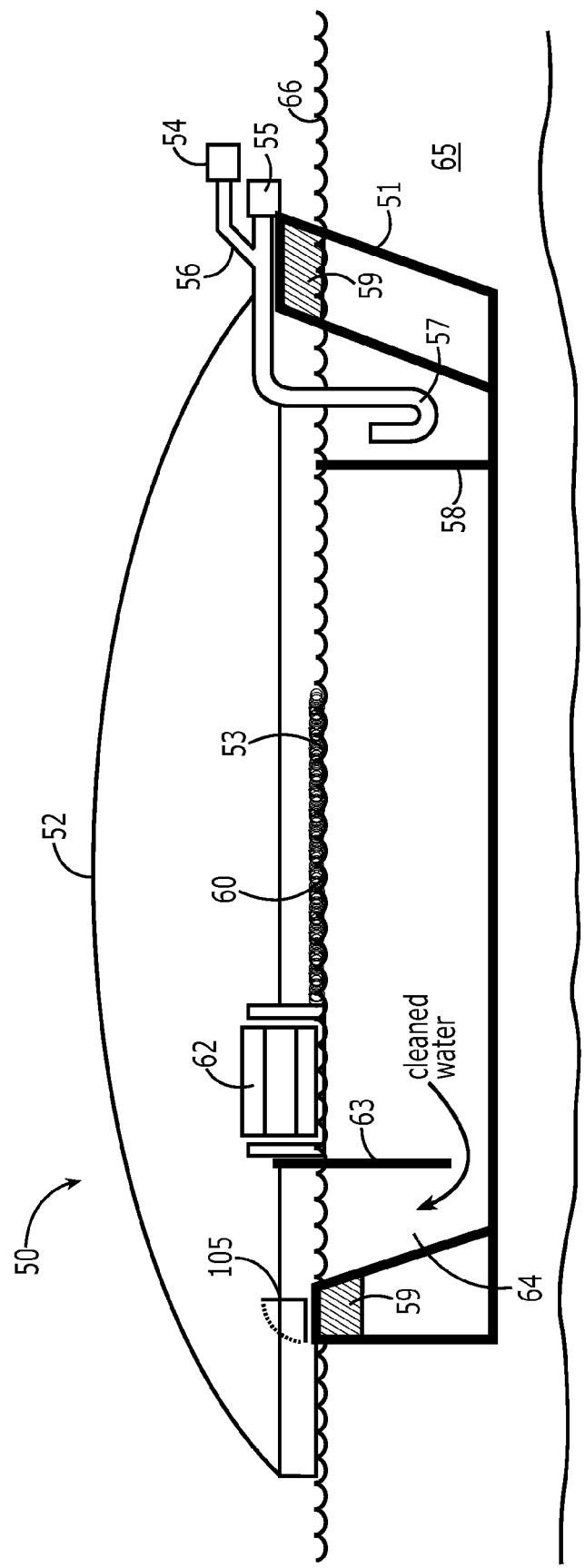
FIG. 3 is a side cross-sectional view of an embodiment for immersion in a body of water.
Figure 4:
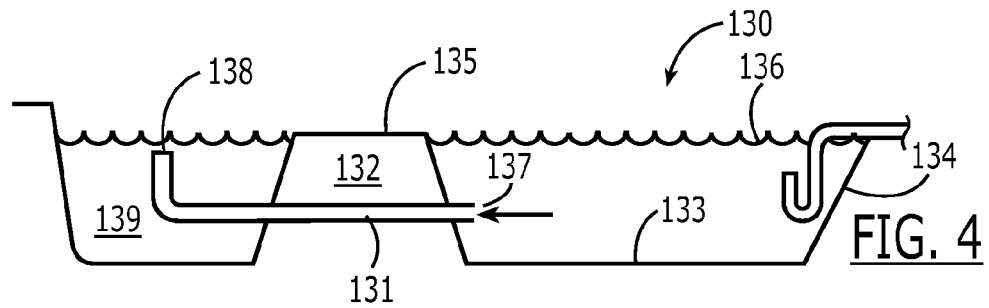
FIG. 4 is a side cross-sectional view of an embodiment having no separate inflow basin, and including piping for channeling cleansed water out of the treatment basin.
Figure 5:
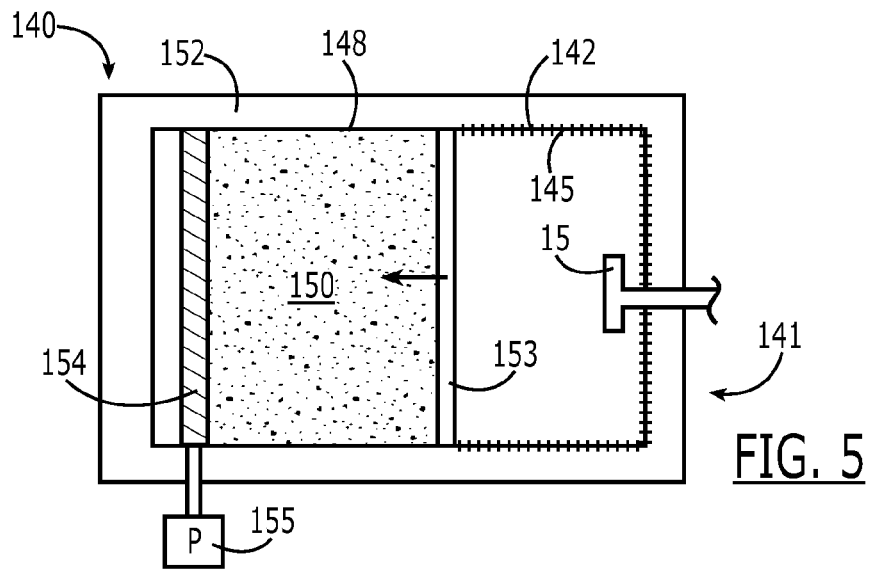
FIGS. 5 and 6 are top plan and side cross-sectional views of an embodiment wherein a channel is formed around an outlet portion of the vessel using suspended weirs, and floating material is removed from a gutter.
Figure 6:
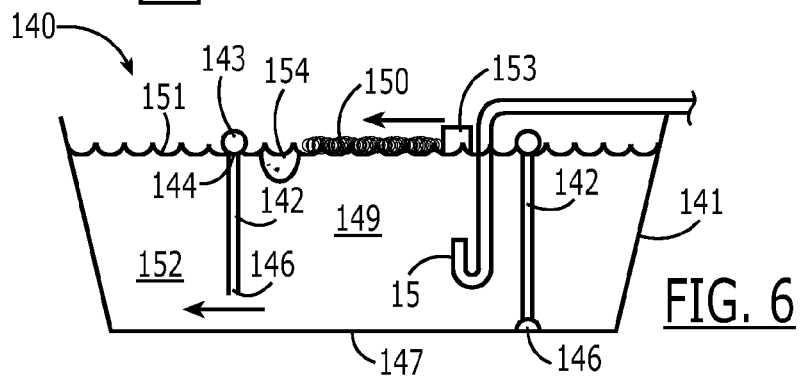
Figure 7:
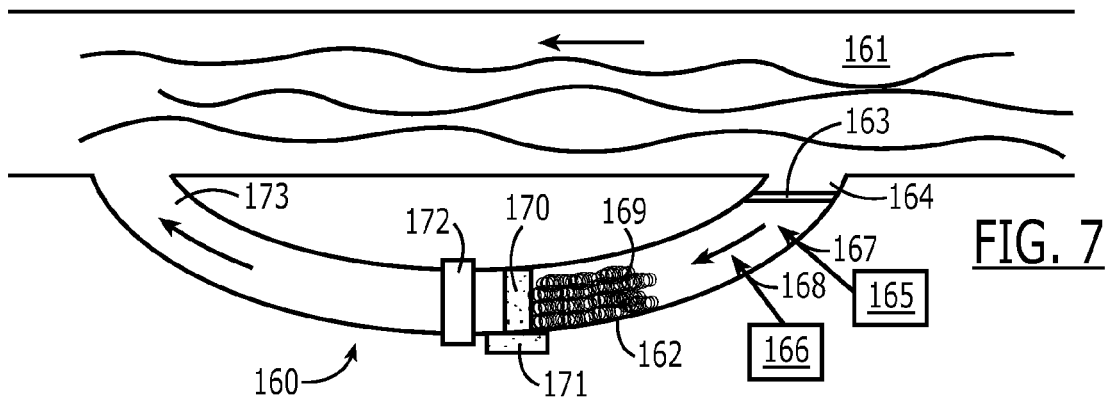
FIG. 7 is a top plan view of an embodiment for use with flowing water.
Figure 8:
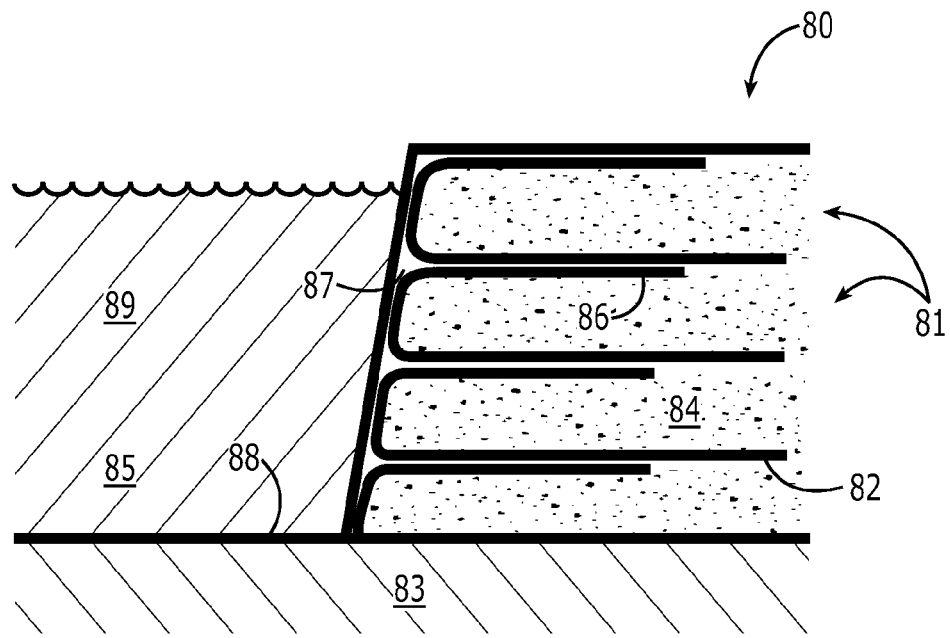
FIG. 8 is a side cross-sectional view of an inclined earth wall.
Figure 9:
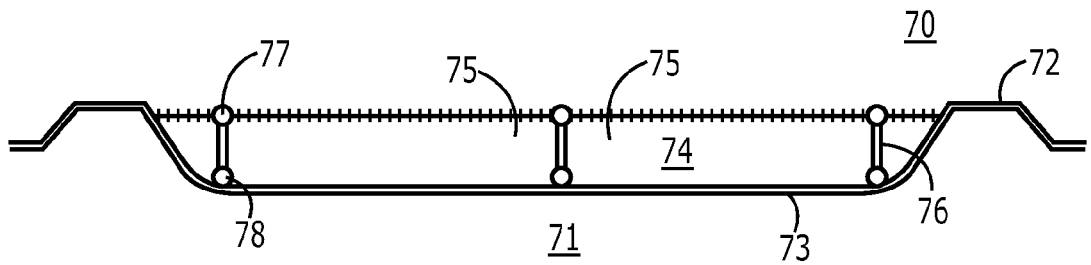
FIG. 9 is a side cross-sectional view of a sloped earth wall.
Figure 10:
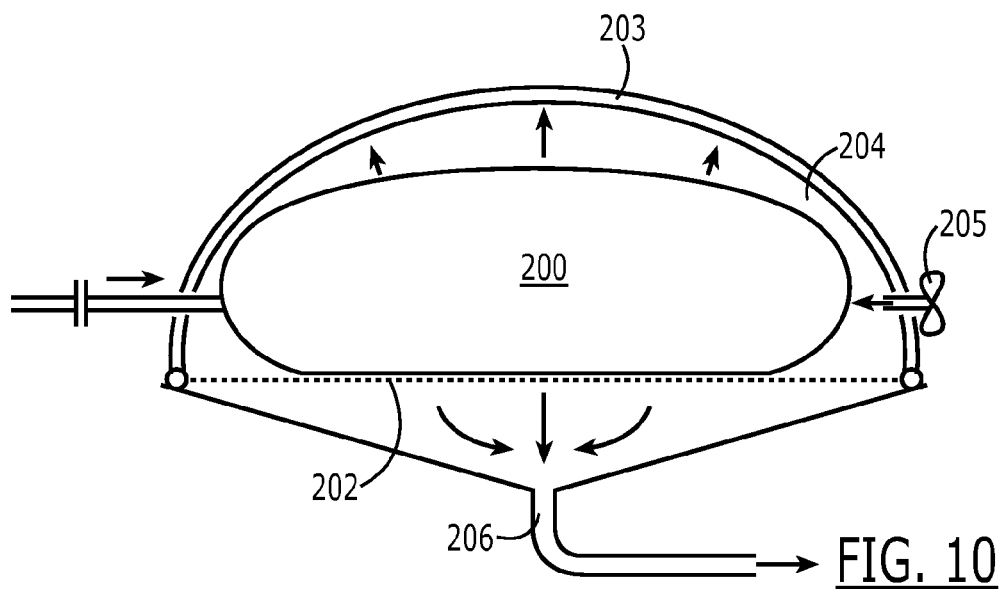
FIG. 10 is a side cross-sectional view of a device for dewatering collected floating material.

A description of the preferred embodiments of the present invention will now be presented with reference to FIGS. 1-15.

A DAF vessel 10 of the present invention has the following components: inflow zone, flotation cell zone, flotation collection zone, and outflow zone. Settlable solids drop to the bottom, and a collection system or underdrain piping periodically removes them. In a preferred embodiment 10, solids float to the surface and are removed onto a ramp, also called a beach 16, via chain and flight scrapers or other methods. Typically 0.5 to 7 gpm flow per square foot of flotation zone can be used for sizing of filters depending on many variables. A preferred minimum depth is 12 in., and the depth can exceed 12 ft.

An important element of this flotation process is carefully crafted air micro-bubbles in solution. The generation of micro-bubbles can be accomplished with an air saturation tank, liquid high-pressure pump, and an air compressor in a system, which allows a clean side stream 17 of micro-bubble water to be held under pressure, for a period of time, so that when the pressure is released, tiny micro-bubbles form in the water feed tube 18 that ultimately release in the DAF basin and float SS up to the surface for collection. There are many micro-bubble generators 20 with various characteristics, depending on the specific application.

The rise within the DAF system 10 of the micro-bubbles is related to the size of the bubbles. The smaller the bubbles, the smaller the particulate matter that floats and the slower the rate of rise. An exemplary desired rate of rise is 1 ft/min, which can be achieved with bubbles 10 to 20 micrometers in diameter.

Minute concentrations of ozone or other coagulation means or chemicals bring together small particles by altering their surface charges so that they form larger particles or "flocs," which can be floated by larger bubbles, with a faster rate of rise. Flocculation occurs during gentle mixing of water, coagulant, and SS. These variables contribute to an efficient DAF filtration system with balanced volume-to-flow ratios.

DAF systems are known for their ability to produce a waste stream of very high solids concentration, in the range of 1 to 5%. In large lake or surface water systems, this is a significant advantage, owing to the advance of material to dewater and dispose.

Algae are particularly difficult to dewater because surface charges cause the cells to repel each other. Evolutionary selection has suited planktonic algae with a hydration advantage. Because of their surface charge density, interstitial spaces remain between them that can retain water for surviving dry conditions, where crowding would isolate and kill closely buried cells.

Coagulation chemistry alters the ionic charge at the surface of algal cells and other SS, such that they come together to form a flake. This aggregated flake is of sufficient size that it can be floated with micro-bubbles introduced to the DAF inflow. A desired micro-bubble size range is 5-50 micrometers, with an optimal size in the 10-20 micrometer range.

Ozone pretreatment is known to greatly enhance coagulation chemical effectiveness, by as much as 90%. Ozone prepares the ionic charge and charge density so that small particles cling together by static charge. Ozone takes SS from a difficult-to-dewater state and helps consolidate SS, allowing greater water removal and de-watering.

The zeta potential can be defined as the potential of distance to charge density relationships on a microscopic particle. The zeta potential increases rapidly close to the surface of the particle, and decreases as the distance increases, at an accelerated rate. Coagulation chemistry is finally applied to satisfy and change the more neutral charge farther from the cell, so that it is drawn to adjacent cells. With this method, agglomeration and dewatering can be achieved more quickly than with evaporation alone. One or more coagulation chemicals or methods can be used for optimal results in different water systems or in the same water system depending on seasonal fluctuation and concurrent phytoplankton/SS speciation changes.

Some common coagulation chemicals can include: calcium hydroxide, calcium oxide, calcium carbonate, poly aluminum chloride (PAC, which can also serve as a flocculant, and is believed at the time of filing to represent the preferred embodiment), aluminum chlorhydrate, cationic polymers, anionic polymers, ferric chloride, and aluminum sulfate. Along with polymer chemicals, many other substances can be used to aid ozone coagulation, such as alginates and other natural products. Some common natural substances include: sodium alginate, clays, sodium in complex with other materials, macerated algal cells, powdered carbon, chitin, and starches.

The DAF provides synergistic benefits when configured in an ozone/DAF/periphyton sequence. Ozone/oxygen gas commences oxidation with rapid ozone-mediated reactions. Oxygen mediates follow-on reactions, which take considerably longer. An oxidation-reduction reaction requires up to 80 minutes to occur in the ozonation/oxidation of lake water. The main body of the DAF can be sized for sufficient volume to allow reactions to complete prior to entering the periphyton filter.

Electro-coagulation may be used with ozone and/or natural or chemical products for optimal coagulation. Electro-coagulation utilizes anodes and electric current to alter particle surface charges. A combination of one or more coagulation methods can yield a very cost-effective coagulation system.

The DAF system 10 also removes microinvertibrates in the inflow, keeping them from damaging aquatic plant like periphyton crops, which have been cultured to remove nutrients such as nitrogen and phosphorus.

As previously discussed, DAF technology is known for its ability to remove high solids content. This is much higher than other technologies such as sand filters, which are typically below 1% in solids rejected. Handling of high-solids waste streams requires special pumping systems and handling considerations. Physically locating the DAF adjacent to the drying beds or thickening process, near the solids raking system, adjacent the DAF, allows for further thickening without high solids pumping or physical distribution with mechanized equipment.

One embodiment of a DAF system 10 (FIGS. 1 and 2) induces micro-bubbles into a specially modified dirty water micro-bubble generator pump 20 receiving air from an air source 119. The micro-bubble generator pump 20 forces compressed air into the pressure part of the pump 20, and forces fluid through piping 17 receiving from the water body 65. The formed micro-bubbles mix with the water and proceed to a saturation tube 120, which comprises a wider section of the piping 17. The saturation tube 120 provides the bubbles with residence time to distribute into the water. The saturation tube 120 is followed by a cracking valve 100, which restricts flow and causes pressure to build in the saturation tube 120 to assist in bubble mixing. The micro-bubble solution then joins with the main flow 18.

The main flow 18 proceeds through a serpentine pipe, along which are two injection ports in this particular embodiment 10. Through a first injection port 103 is inserted a coagulant from tank 104. Through a second injection port 106 downstream of the first injection port 103 is inserted a flocculant from tank 105. In an alternate embodiment, the flocculant can be inserted directly into the inflow basin 29. It is believed that coagulant causes biomass such as algae to form flocs, since the surface charge is altered. These flocs form among the micro-bubbles. The flocculant then attaches the flocs together around the bubbles.

This embodiment of a DAF filter system 10 has an inflow compartment or basin 29 into which the micro-bubble/influent mixture is pumped 39 through piping having a generally "U"-shaped end portion 40 into a manifold 15 having a plurality of apertures 41, preferably pointing upwards. The water in the inflow basin 29 is allowed to sit undisturbed, substantially at zero velocity, to dissipate energy, which is preferred for light SS to separate and rise with the micro-bubbles. The water passes over an inflow baffle 28 having sealed sides 42. The inflow baffle 28 extends from a bottom end 281 at the vessel bottom 43 to a top end 282 beneath the top edge 44 of the vessel 10. This places the SS and bubbles 23 at the surface 36, promoting a consolidation of floating solids/biomass to form. The inflow baffle 28 also contains any solids that are heavy and not influenced by the bubble interaction. A flotation chamber 19 downstream of the inflow basin 29 receives a blanket of floated SS 23 that is transferred to a collection point and removed by a conveyor 24 or other means. In some cases the inflow baffle 28 can be eliminated in lieu of a serpentine discharge manifold placed 1-2 ft below the water surface.

A solids raking system with chain, paddles (flights), and sprockets can be used to collect the floated SS 23 to a beach 16, which lifts the SS off the water surface 36 and into a drying bed, geotube (FIG. 10), or other dewatering equipment, where it is further dewatered. In cases where the DAF treatment basin 19 is so wide that the raking system has to span a great distance, semi-buoyant paddles can be used to reduce span requirements. Alternatively, a traveling rake can be used to push the floated SS 23 to the conveyor 24.

One or more static or pneumatic blowers 21 can also be used to generate air currents to move the floating scum 23 to the conveyor 24 and beach 16 and into a collection receptacle 22. In the embodiment illustrated, the conveyor 24 comprises a reversible device having a moving belt for conveying the raked scum 23 toward the beach 16, or, in the other direction, another beach 16' or collection vessel. Here the conveyor 24 extends across the treatment basin 19 from a first side 25 to an opposed second side 26.

A drainage system under the DAF liner 27 can be used to allow sub-surface water and gases to vent and preclude displacement of the liner 27 from its desired location at the soil surface. A media-covered under-drain 11 can be positioned within the DAF chamber 19 for extracting all or part of the DAF during maintenance.

Many methods can be used to process the floated solids for disposal or use. One embodiment moves solids from the collection receptacle with a pump, which conveys the scum filtrate to a dewatering facility, which can be positioned nearby. A centrifuge can be used in some embodiments to dewater the floated scum to a wet cake, typically in the 20-30% solids range.

Alternatively, dewatering can be accomplished with the use of a geotube 200 (FIG. 10), which receives the scum 23 via piping 201. The geotube 200 is positioned on a surface 202 and is covered with a water-impermeable, for example, clear plastic, sheet 203. Between the geotube 200 and the sheet 203 a fan 205 blows air, which creates a space 204. The sun heats the space 204, which assists in the dewatering process. Water exiting the geotube 200 exits through an underdrain 206.

With a liner 27 as the sole containment means, an economical design method exists to build a very large DAF filter process unit 10 at low cost, when compared with conventional steel and concrete vertical structures with footings and foundations. This embodiment 10 provides an enhanced ability to use DAF technology well beyond the scale of traditional metal and concrete vessel designs, which have limitations due to construction cost. Geotextiles can be used in construction of the DAF liner 27.

Effluent from the DAF system 10 flows under an outflow weir 38 that is sealed at the sides 42, and extends from a bottom end 381 in spaced relation from the vessel bottom 43 to a top end 382 no lower than the vessel's top edge 44. The outflow weir 38 seals off surface flow, entrapping the floating solids 23 in the flotation chamber 19. The clarified effluent is then transferred from the outflow basin 30 by piping 31. An effluent pump 32 having a float switch 34 can be used to pump the effluent to a lake or to follow-on process units such as ozone and/or periphyton filters and/or other process systems. In the embodiment shown in FIGS. 1 and 2, the basin 19 slopes toward the upstream end 33 of the basin 19, which permits solids to collect in and adjacent a pit 35 in the bottom surface.

Yet another DAF embodiment 140 (FIGS. 5 and 6) comprises alternate forms of the floated material collection system and outflow weirs. Here the DAF basin 141 has a flexible sheet 142 suspended by a flotation element 143 affixed to a top edge 144 thereof. Along an inlet portion 145 of the basin 141, the sheet 142 is weighted or affixed in some other manner at a bottom edge 146 to a bottom 147 of the basin 141. Along an outlet portion 148, the bottom edge 146 is in spaced relation from the basin bottom 147. Thus, water entering the manifold 15 is discharged within an interior treatment portion 149 of the basin 141, wherein floating material 150 rises to the water surface 151. Cleansed water then exits under the bottom edge 146 of the sheet 142 to a peripheral portion 152 of the basin 141, from which it can be pumped out. In a subembodiment, the basin bottom 147 is sloped so that the sheet's bottom edge 146 reaches the basin bottom 147 along the inlet portion 142 but is suspended thereabove along the outlet portion 148.

The floating material 150 in this embodiment 140 is collected with the use of a movable rake 153 that skims across the water surface 151 and pushes the floating material 150 into a gutter 154. The collected floating material 150 can then be pumped 155 from the gutter 154.

Baffles can be made from the same membrane as the basin. Membrane material such as HDPE landfill liner, polyethylene, and a wide variety of synthetic rubber liners can be used, although this is not intended as a limitation. A geotextile drainage system 11 is also employed to allow removal of water from under the DAF liner 27. This allows for predictable performance for the lined earthen basin 19 against ground water and gas discharge, which could displace the liner 27.

An alternative embodiment of a DAF system 130 (FIG. 4) contains no inflow basin, and, rather than having an outflow weir with a space therebeneath as in FIGS. 1 and 2, the outflow channel comprises a pipe 131 extending through a constructed outflow weir 132. This outflow weir 132 can comprise, for example, a concrete or other structure that extends from the bottom 133 of the DAF basin 134 to a top 135 at least as high as the water surface 136. The pipe's inlet end 137 receives cleansed water from adjacent the basin bottom 133 and discharges water from an outlet 138 within an outflow basin 139. As above, the cleansed water in the outflow basin 139 can then be transported therefrom to a desired location, such as back to the water body 65.

In some applications a DAF system 50 can be floated (FIG. 3) at the surface 66 of a body of water 65, similar to a partially submerged boat hull. In this case, the construction can utilize light-gauge steel, aluminum, or fiberglass material for the walls 51 instead of a membrane, resulting in lighter structure and lower cost, and eliminating the requirement to resist land-based wind loads. A cover 52 can be used to isolate the DAF surface 53 against wind and jumping waves, which could corrupt the flotation process. A flotation collar 59 helps keep the system 50 afloat. A service barge can supply a motor-driven micro-bubble pump 54, chemical storage, and filtrate storage basin. Water can flow out over check valve 105 back to the water body 65; however, if a wave flows toward the basin 50, the check valve 105 will prevent inflow. This design uses no land and allows relocation of the DAF 50 with relative ease when compared with a land-based vessel. This boat-style DAF 50 is very well suited to dredging projects.

In the embodiment shown, the main inflow 55 joins the micro-bubble side stream 56, through a coagulant injection point, to the inflow manifold 57, again upstream of an inflow baffle 58. Again, solids 60 collect on the surface 53, and are collected with a scum rake 62 and scraped to a tender barge adjacent the floating DAF 50, or are pumped directly to a land-based collection system. Cleaned water flows beneath an outflow weir 63 into an outflow basin 64, from whence it exits the system 50 into the main basin 65.

Additional floating embodiments may be contemplated (FIGS. 11-15), wherein the vessel can be movable through the body of water, or passively floating. These embodiments can be used with or without a DAF system, and rely in large part on natural water movement, such as choppiness, currents, or wave action, or the movement of water relative to a moving vessel, to channel water to a treatment unit. The collected solids can contain such components as plankton varieties, microinvertebrates, and small fish, which can ultimately be processed into fuel such as biodiesel.

Figure 11:
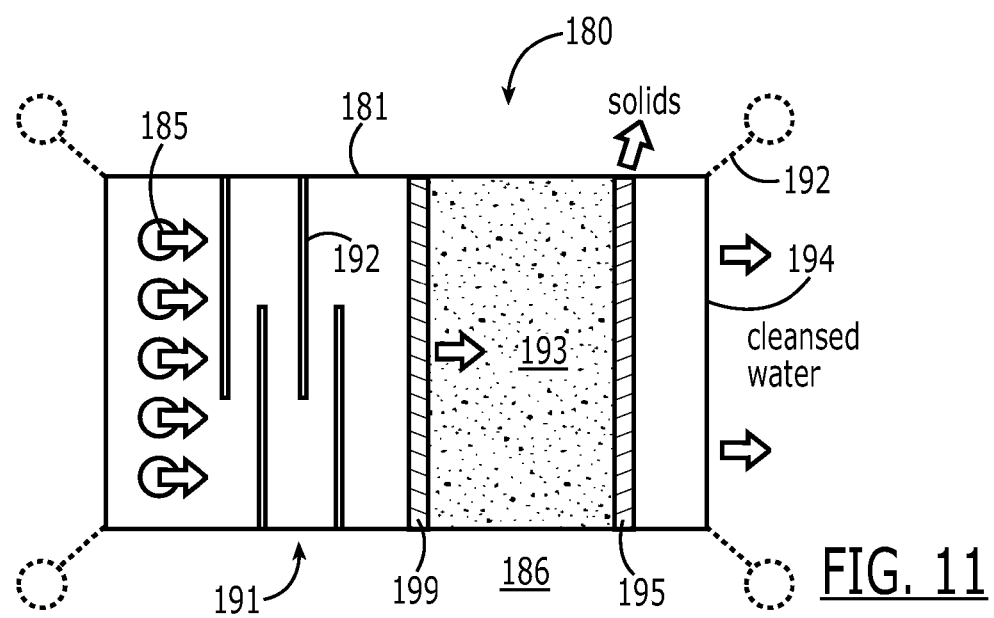
FIGS. 11 and 12 are top plan and side cross-sectional views of a floating platform or barge for remediating water and collecting entrapped solids.
Figure 12:
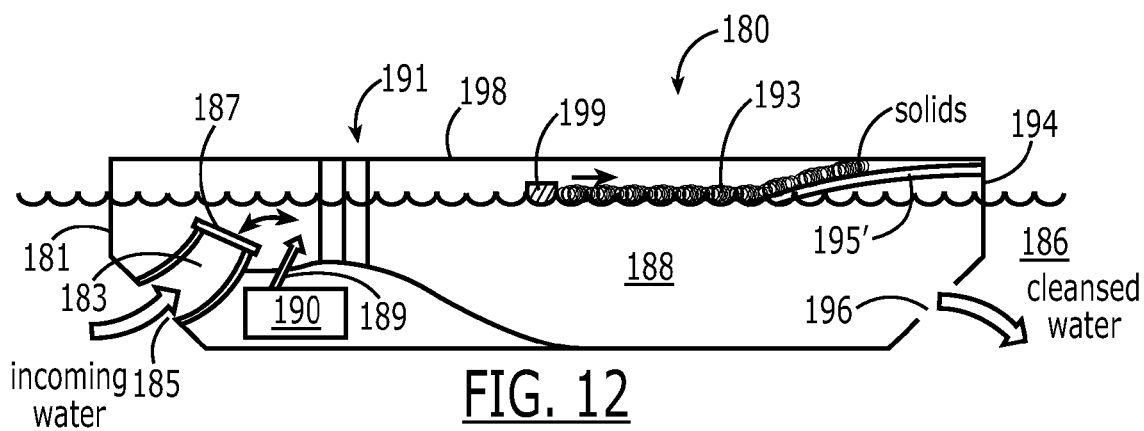

A system 180 including a floating platform or barge serving as a vessel 181 for remediating water and collecting entrapped solids is illustrated in FIGS. 11 and 12. If the vessel 181 comprises a floating platform, anchors and tethers 182 (shown with dotted lines) are used to retain the vessel 181 in a substantially fixed location, and a pump may be used to draw water in. If the vessel 181 comprises a barge, during operation, the barge will be moving to create relative motion with the water body.

The vessel 181 has a water inlet, or aperture, 183 at an inlet end 184, which in the case of a barge would be the forward end. The water inlet 183 has an opening 185, and, in some embodiments, a plurality of openings 185, in fluid communication with the water body 186. A check valve 187, such as a flapper check valve, although this is not intended as a limitation, is positioned along the inlet channel 183. The check valve 187 serves to allow water to enter but not to escape, and also prevents the treatment basin 188 downstream of the check valve 187 from overflowing.

Downstream of the check valve 187 is positioned at least one port 189 for the introduction of an entrapment element 190, such as a coagulant or a flocculant or a combination thereof. Following the at least one port 189 is a mixing pathway 191, which can comprise in one embodiment a serpentine flow path created by a plurality of interdigitating curtains 192 that can be suspended from a cover 198 in an orientation such that their inner ends overlap. The mixing pathway 191 causes a turbulent flow to achieve blending of the entrapment element 190 into the incoming water.

The entrapment element 190 causes suspended and dissolved solids to coalesce and form either a floating mass or a settled mass, depending upon the system conditions. In the embodiment shown in FIGS. 11 and 12, floating solids 193 are moved toward the outlet end 194 of the vessel 181 using a moving rake 199, where they are collected in a gutter 195 or on a ramp 195', or by other means, and then extracted to another location, on or off the vessel 181. Cleansed water beneath the floating solids 193 flows out an outlet 196 at the outlet end 194.

Figure 13:
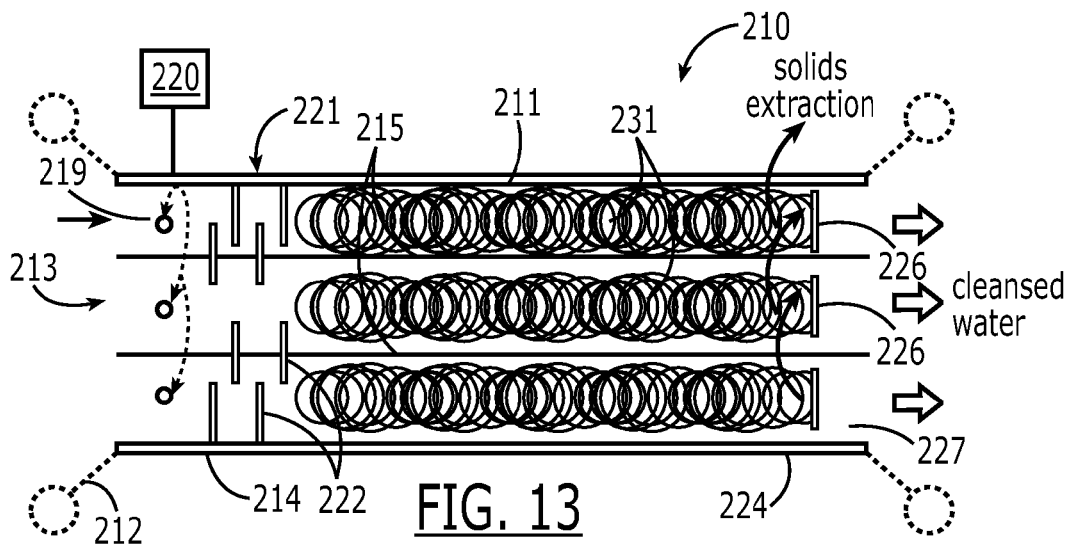
FIGS. 13 and 14 are top plan and side cross-sectional views of a floating, modular water-remediation and entrapped solids collection system
Figure 14:
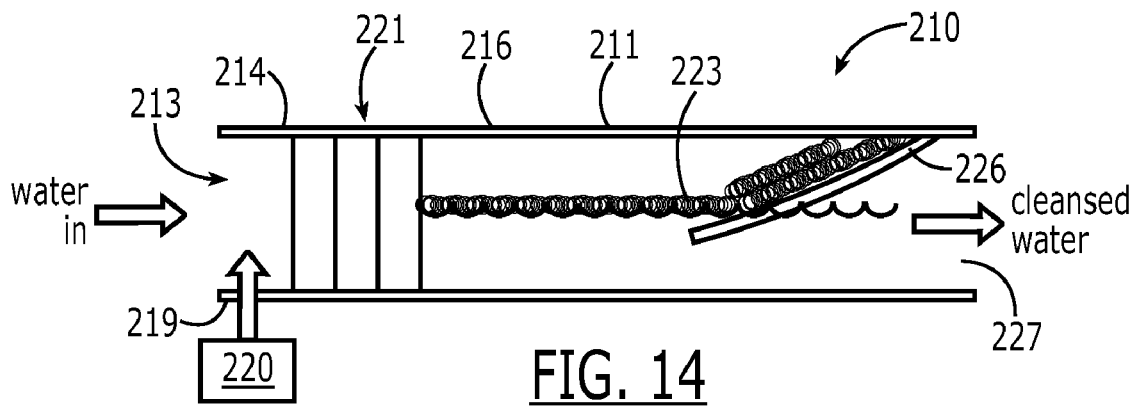
Figure 15:
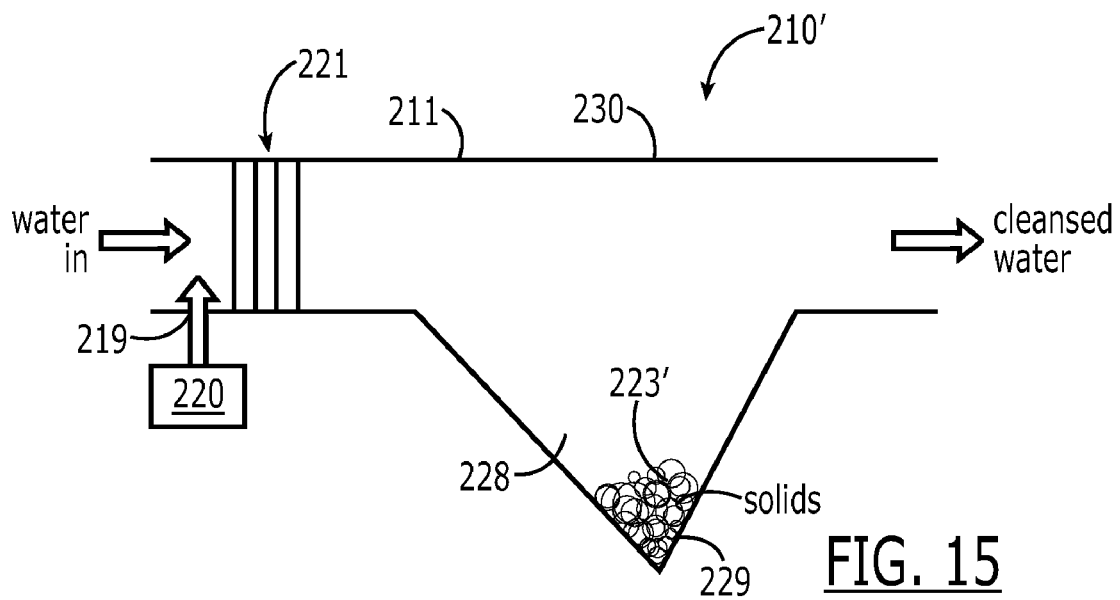
FIG. 15 is a side cross-sectional view of an alternate embodiment of the system of FIGS. 13 and 14 for collecting settled entrapped solids.

Another system 210,210' including a floating platform or barge serving as a vessel 211 for remediating water and collecting entrapped solids is illustrated in FIGS. 13-15. If the vessel 211 comprises a floating platform, anchors and tethers 212 (shown with dotted lines) are used to retain the vessel 211 in a substantially fixed location, and a pump may be used to draw water in. If the vessel 211 comprises a barge, during operation, the barge will be moving to create relative motion with the water body.

The vessel 211 is divided into a plurality of substantially parallel channels 231, each of which has a water inlet 213 at an inlet end 214 in fluid communication with the water body 218. The channels 231 can be formed, for example, by curtains 215 suspended from a cover 216 or from a flotation element.

The system 210,210' comprises at least one port 219 for the introduction of an entrapment element 220, such as a coagulant or a flocculant or a combination thereof. Following the at least one port 219 is a mixing pathway 221, which can comprise in one embodiment a serpentine flow path created by a plurality of interdigitating curtains 222 that can be suspended from the cover 216. The mixing pathway 221 causes a turbulent flow to achieve blending of the entrapment element 220 into the incoming water.

The entrapment element 220 causes suspended and dissolved solids to coalesce and form either a floating mass or a settled mass, depending upon the system conditions. In the embodiment 210 shown in FIG. 14, floating solids 223 move toward the outlet end 224 of the vessel 211, where they are collected in a ramp 226, or by other means, and then extracted to another location, on or off the vessel 211. Cleansed water beneath the floating solids 223 flows out an outlet 227 at the outlet end 224.

In the embodiment 210' shown in FIG. 15, settled solids 223' move toward a settling zone 228 at the bottom 229 of the vessel 211, from where they are extracted. This embodiment 210' can includes a floating curtain 230 as a cover. It will be understood by one of skill in the art that a combination of these embodiments 210,210' could also be envisioned.

It will also be understood by one of skill in the art that an additional unit such as a DAF could be added to these systems 180,210 following the mixing pathways 191,221 to assist in solids entrapment.

A further embodiment of a DAF system 160 (FIG. 7) can be used to cleanse flowing water from a river 161, for example. In this system 160 the "basin" 162 comprises a side stream channeled from the river 161, under control of a gate valve 163 at an inlet 164. Coagulants 165 and flocculants 166 are injected 167,168 downstream of the gate valve 163 as above. Floating material 169 can be collected on a conveyor/rake 170 and beach collection area 171 as above, or by other means, and cleansed water flows under an outflow weir 172, also as above, and thence to join the river 161 at an outlet 173 of the system 160.

There are many possible uses for the solids removed from the DAF process. One such application is a soil amendment applied to soils poor in nutrients, where the tilth and macro- and micronutrients are amended. Another use is as a fluid soil culture system such as in sod culture over a membrane. Another use is as a fiber or filler in paper and paper product manufacturing process. Yet another use is as a feedstock for methane and ethanol, or other alcohol (e.g., butanol) production. Algal oil can also be extracted and processed into biodiesel. A further use is as a feed for animals.

The DAF vessel 10 can be constructed for use in floating applications where water in the basin supports the vessel walls, and greatly reduces the thickness of vessel walls, supporting structure, and foundations and allows mobile floating DAF for dredging or SS removal applications from surface waters.

The DAF solids can be connected to the outflow system directly adjacent to the DAF such that high-solids floatables can be dried without conveyance. Solids can be collected with a conveying pneumatic blower. Semi-buoyant paddles can be used on the rake system. Membrane baffles can be used with stiffening spars or elements to help them keep their desired planar geometry and position within the vessel.

In the creation of the liner for the systems 10,50, geotextile or nursery ground cloth can be used, and excavations can have slopes steeper than the angle of repose of the soil 12. If the walls are over-excavated and built in 6-12-in. lifts wherein fabric liner 27 is formed on a three-sided tube, this restrains the soil 12 and increases the horizontal shear over just soil alone. Higher, more vertical, soil-retaining wall structures can be built using this method.

A soil membrane DAF 70 (FIG. 9) can be constructed in ground 71 below grade and perimeter bermed 72, with a geotextile liner 73 as above supporting the water basin 74. this embodiment 70 also illustrates a principle that can operate in any DAF embodiment, namely, subdivision into individual sectors 75 using "curtains" 76 that can have floaters 77 at a top end and an anchor 78 at a bottom end.

A similar system 80 can also be positioned above the existing grade, and/or manmade structures used to bolster the basin wall, or change the angle thereof, since it is currently believed that a steeper angle is preferable. In the system 80 shown in FIG. 8, for example, a plurality of "fill cells" 81 can be created by laying geotextile liner 82 on the ground 83 and placing soil 84 or other material atop a portion of the liner 82 up to where the liner 82 is intended to define the basin 85, leaving a length of liner 82 uncovered. This uncovered portion 86 can then be folded back over the compacted soil 84, and this process repeated with additional cells 81 until a desired height is reached. If desired, a stiffening element 87 can be inserted between adjacent cells 81 to improve stability. When complete, another liner 88 is placed to line the basin 85 as above, and water 89 channeled thereinto. Well point dewatering techniques can allow in-ground construction where the water table is near the surface.

In another embodiment, excavations can simply rely on the natural angle of repose of the soil and incorporate cable- or float-supported membrane curtains to form the vertical walls of the liner-based, ditch-style DAF.

Ozone, DAF, and periphyton systems can be used in a modular system to remove microinvertabrates and particulate nutrients bound in algae and bacteria, as well as dissolved nutrients.

The collected material can be used as a soil amendment, hydro-seed carrier, and soil stabilizer. The collected material and other aquatic biomass can also be used in paper or a paper product, with or without coagulation chemicals and other substances to increase freeness, increase adhesion to fibers, and aid drainage. The SS and other aquatic biomass can be used in a fluid soil culture system with and without coagulation chemicals and other substances. The collected biomass can also be used to create hydrogen/biodiesel/alcohol fuels.

Another benefit of the systems of the present invention is that a certain degree of desalinization has been found to occur, approximately 50-60%, which could be extremely beneficial for the creation of fresh water from seawater.

Electro-coagulation can be employed for enhancing the performance of the soil and membrane DAF with and without other coagulation means. Natural and man-made chemical coagulants can be used with the liner DAF for enhancing the flotation characteristics of the DAF, with or without electro-coagulation and ozone. Geotextiles can be used for solids dewatering of algal solids from the soil and membrane DAF.

Solar drying and composting can be performed with algal solids from the soil membrane DAF and periphyton culture systems. Manipulation and use of DAF volume and concurrent residence time can allow for ozone and oxygen and oxidation-reduction reactions to complete prior to periphyton filtration.

A sump and manual vacuum system can be used for periodic sinkable particle removal.

Another aspect of the invention is directed to a means for harvesting aquatic plants and planktonic or other algae via a coagulation and acidification process that creates an algal nutrient in recycle water as it stabilizes $CO_2$ in for uptake by aquatic plant culture systems, which can be used in bio-fuels generation and other uses.

In a preferred embodiment, algae harvested from process culture water is coagulated, or caused to collect in a floc, with the use of limewater. Calcium oxide, calcium hydroxide, and calcium carbonate (raw and processed forms of limestone) combined singly or together in water, cause a pH rise and disrupt repelling surface charges of small particles, causing them to collect and form a flake. These flakes are agglomerated with polymers into large flakes, which are easily floated to the surface and raked or blown off and collected.

pH correction can typically be required and can be effected by various means such as liquid acids, such as via carbon dioxide. If $CO_2$ is used to adjust pH, a synergy occurs as the $CO_2$ converts residual calcium oxide to bicarbonate, the form of carbon preferred by plants. When water is returned to the culture system, it is already amended with carbon. Additionally, this carbon is stable and will not off gas like dissolved $CO_2$.

This culture water can be amended with other sources of nutrients from animal husbandry operations and wastewater plants, and this balanced nutrient media cultures more algae, which can be further bio-refined to produce energy.

Carbon dioxide is an atmospheric gas having a concentration of about 0.033% or 330 ppm. At room temperature, the solubility of carbon dioxide is about 90 cm$^3$ of $CO_2$ per 100 mL of water. In aqueous solution, carbon dioxide exists in aqueous form and come to equilibrium with $H_2CO_3$, carbonic acid. Carbonic acid is a weak acid, which dissociates to $H^+ + HCO_3^-$ (bicarbonate).

At this stage algal culture can take up the bicarbonate as a source if carbon, which is biofixed. Steps can be taken to sequester the carbon, or the algae can be digested, fermented, or gasified to produce energy.

The carbonate ions cause precipitation of $Ca^{2+}$. For $CaCO_3$, the reaction constant is $K_{sp}$ is $5 \times 10^{-9}$. Calcium carbonate then takes on H from the water to create carbonic acid. Carbonate precipitates out of the liquid and can be removed and used for many purposes. At this point the carbon is sequestered in stable form.

A second embodiment is focused solely on adding bicarbonate as a nutrient for algal culture. First, $CO_2$ is added to the source water and acidifies it driving the pH down. Then calcium oxide, calcium hydroxide, and or calcium carbonate is added to balance pH near neutral. As carbon dioxide dissolves in water, an equilibrium is established involving the carbonate ion. Acidic water dissolves calcium oxide, calcium hydroxide, and or calcium carbonate to yield $Ca^{2+}$ (aq)+2 $HCO_3^-$ (aq)

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the systems and methods illustrated and described herein are by way of example, and the scope of the invention is not limited to the exact details of construction and use. Further, it will be understood by one of skill in the art that the elements of the embodiments discussed and illustrated herein can be interchanged among the embodiments, and that each embodiment is not intended as to be limited to the individual elements presented.

Having now described the invention, the construction, the operation and use of preferred embodiments thereof, and the advantageous new and useful results obtained thereby, the new and useful constructions, and reasonable equivalents thereof obvious to those skilled in the art, are set forth in the appended claims.

What is claimed is:

1. A system for remediating a body of water and collecting suspended and dissolved solids therefrom, the system comprising:

a water-impervious, flexible sheeting positionable to line a depression adjacent a body of water desired to be treated, the sheeting conformable with a surface of the depression, the sheeting and depression defining at least a portion of a treatment vessel, the vessel comprising a treatment portion having an inlet for receiving water to be treated, an outlet portion for containing treated water, and an outflow weir between the treatment portion and the outlet portion, the outflow weir extending to a top end higher than a water surface, and extending across the vessel to side edges sealed against the opposed sides of the vessel;

means for transporting water to be treated from the water body to the treatment portion inlet;

means for delivering a stream of bubbles into the transported water upstream of an outlet end of the transporting means;

means for mixing the bubbles with the transported water, the bubbles for capturing suspended and dissolved solids in the transported water, effecting a separation between the captured solids and water cleansed therefrom, and carrying the captured solids to the water surface; and means for removing the captured solids from the treatment portion, the cleansed water movable through a channel in the outflow weir into the outlet portion.

2. The system recited in claim 1, further comprising an effluent pump having an inlet within the outflow portion and a float switch for activating the effluent pump when effluent in the outflow portion has reached a predetermined depth.

3. The system recited in claim 1, wherein the mixing means comprises a cracking valve and a saturation tube upstream of the cracking valve and downstream of the bubble delivering means.

4. The system recited in claim 1, further comprising a source of at least one of a coagulant and a flocculant, and means for injecting the at least one of the coagulant and the flocculant into the transported water.

5. The system recited in claim 4, wherein the mixing means comprises a serpentine flow pathway upstream of the treatment portion.

6. The system recited in claim 1, wherein the sheeting is positionable in a depression in soil adjacent the water body, the depression sloping downward in the treatment basin toward the inlet.

7. The system recited in claim 1, wherein the sheeting comprises a geo-textile material.

8. The system recited in claim 6, wherein the depression further has a pit therein adjacent the inlet, for collecting precipitated solids therein.

9. A method for remediating a body of water and collecting suspended and dissolved solids therefrom, the method comprising:

transporting water from a body of water to an inlet of a treatment vessel, the treatment vessel formed by a water-impervious, flexible sheeting positioned in and conforming with a depression adjacent a body of water desired to be treated;

delivering a stream of bubbles into the transported water upstream of a treatment portion of the treatment vessel;

mixing the bubbles with the transported water, the bubbles for capturing suspended and dissolved solids in the transported water, effecting a separation between the captured solids and water cleansed therefrom, and carrying the captured solids to a surface of the water;

channeling the mixed water and bubbles to the treatment portion;

removing the captured solids from the treatment portion; and permitting the cleansed water to move into an outlet portion of the treatment vessel.

10. The method recited in claim 9, wherein the mixing step comprises channeling the water and bubbles to saturation tube and thence to a cracking valve.

11. The method recited in claim 9, further comprising injecting at least one of a coagulant and a flocculant into the transported water.

12. The method recited in claim 11, wherein the mixing step comprises channeling the water into a serpentine flow pathway upstream of the treatment portion.

13. The method recited in claim 9, wherein the flexible sheeting is positionable in a depression in soil adjacent the water body, the depression sloping downward in the treatment basin toward the inlet.

14. A method for constructing a water-remediation and solids-collection system comprising:

positioning a water-impervious, flexible sheeting in a depression adjacent a body of water desired to be remediated and from which solids are desired to be collected, the sheeting conformable with a surface of the depression; and positioning an outflow weir adjacent an outlet end of the vessel to extend to a top end at least as high as an intended level of water in the treatment vessel, and across the vessel to side edges sealed against the opposed sides of the vessel, the outflow weir and an outlet portion of the vessel sides containing the outlet end defining an outflow portion;

providing means for transporting water to be treated from the water body to a region of the treatment basin;

providing means for delivering and mixing a stream of bubbles into the water being transported upstream of an outlet end of the transporting means, the bubbles for capturing suspended and dissolved solids in the transported water, effecting a separation between the captured solids and water cleansed therefrom, and carrying the captured solids to a water surface;

providing means for removing the bubbles and captured suspended solids from the treatment basin; and providing means for channeling the cleansed water out from the outflow basin.

* * * * *